Patented Sept. 21, 1937

2,093,405

UNITED STATES PATENT OFFICE 2,093,405

MANUFACTURE OF GUM OF PREPARED GUM CLASS

George W. Apsey, Jr., Rutherford, N. J., assignor to Jacques Wolf & Co., Passaic, N. J., a corporation of New Jersey No Drawing. Application August 28, 1935, Serial No. 38,210

7 Claims. (Cl. 87—28)

This invention relates to the manufacture of vegetable gum solutions, one common use of which is, in textile printing, as a carrier of a dyestuff, pigment, mordant, discharging agent, developer, resist, etc. The clearer or more transparent the solution is, or the less it has of cloudiness, whether of coloration or otherwise, the more will the printing or other process be facilitated, and, in printing, the clearer, brighter and sharper will be the impressions.

In the case of certain vegetable gums, of the so-called "prepared" gum class, as karaya and shiraz for example, cold water will only reduce them to a jell; in order to prepare actual solutions of them heat as an auxiliary is necessary. But if it be attempted to dissolve in water in the presence of heat a gum of this class existing in the raw state (by which I mean not the perfectly pure or refined gum but the gum associated with wood, bark and other bodies containing natural tannins or natural dyewood coloring matters, or it may be the gum itself containing such tannins and coloring matters) it is known that the resulting solution is not actually clear but is usually markedly cloudy. (By the term "cloudy" I am to be understood to mean any condition which detracts from the transparency or clearness of the solution, as due to presence of actual color imparted by the tannins and dyewood coloring matters as well as of perhaps merely opaque particles in suspension.) The tannins and dyewood coloring matters in water in the presence of heat color and so act to cloud the solution.

It has been proposed (Pfister Patent No. 1,873,631) to produce cloudless solutions of raw gums of the prepared class by first reducing the gum to a jell with the use of cold water (heat at this stage being avoided to prevent extraction of color) and then filtering the jell to remove bark or other particles or bodies possibly carrying color imparting substances, whereupon the jell, thus rid of such matter, would be reduced to solution form in water in the usual way with the aid of heat. In other words, it was thus sought to obtain a clear solution by physical removal of the color imparting impurities in advance of application of the heat necessary in the forming of the ultimate solution but a potential factor in producing coloration and hence cloudiness.

According to the present invention any tannin or dyewood coloring matter that might otherwise act to color and so cloud the solution is rendered by chemical action actually impotent to do so, a compound or precipitate being formed (of which any such material becomes a constituent) which is insoluble, so that it as well as all other materials which would render the solution cloudy may be separated from the solution as by filtering.

In short, I make use of some substance which will form indifferently with either tannin or dyewood coloring matter present in or associated with the gum an insoluble compound or precipitate.

As such substance I have for example used a metallic compound, as the organic compound antimony potassium tartrate or it might be a metal compound in the form of an inorganic salt, as antimony fluoride or sodium antimonate. Such will form with any tannins present insoluble tannates or with any soluble dyewoods insoluble lakes of dyewood coloring matter; or insoluble dyewood tannates or other insoluble compounds may form. In due course such compound or compounds formed may be removed from the mixture, as by filtering. Of course, in order to reduce a gum of the prepared class to solution form heat with water is used, the temperature, pressure and time required to form the solution being in accordance with the accepted practice therewith concerned.

By way of specific example, having one (1) liter of cold water, five (5) grams of antimony potassium tartrate are placed therein. One hundred (100) grams of, say, raw karaya gum are added and the whole boiled until the gum is dissolved. Thereupon, having preferably added any suitable filter medium, the insoluble compound or precipitate formed by the indicated metallic compound and the tannins and dyewood coloring matters existing in or with such gum is filtered off, together with other solids, after which the solution may be concentrated to the proper viscosity and, if desired, such concentrate by drying be converted to solid form and thus preserved until it is to be used.

Essentially my invention is a matter of forming a solution of the gum with water in the presence of a substance, as a metal compound, which will form with either tannin or dyewood coloring matter present in or associated with such gum an insoluble compound.

The invention also comprehends a preparation in which substantially the pure gum content exists in solution state and any tannin or dyewood coloring matter originally present in the raw gum is a constituent of an insoluble compound.

The term "solution" as here used is to be understood as meaning a liquid as distinct from a mere jell.

Having thus fully described my invention what I claim is:

1. The hereindescribed method of treating a raw vegetable gum of the prepared class which consists in forming a solution of such gum with water in the presence of a substance active and in such quantity as to form with substantially all of either tannin or dyewood coloring matter present in or associated with the gum an insoluble compound.

2. The hereindescribed method of treating a raw vegetable gum of the prepared class which consists in forming a solution of such gum with water in the presence of a substance active and in such quantity as to form with substantially all of either tannin or dyewood coloring matter present in or associated with the gum an insoluble compound, and separating the solid and liquid contents of the resulting mixture.

3. The hereindescribed method of treating a raw vegetable gum of the prepared class which consists in forming a solution of such gum with water in the presence of a metal compound active and in such quantity as to form with substantially all of either tannin or dyewood coloring matter present in or associated with the gum an insoluble compound.

4. The hereindescribed method of treating a raw vegetable gum of the prepared class which consists in forming a solution of such gum with water in the presence of a metal compound active and in such quantity as to form with substantially all of either tannin or dyewood coloring matter present in or associated with the gum an insoluble compound, and separating the solid and liquid contents of the resulting mixture.

5. The method of treating a raw gum of the prepared class which consists in forming a bath including water and a substance active and in such quantity as to form with substantially all of either tannin or dyewood coloring matter present in or associated with such gum an insoluble compound, and later forming a solution of the gum in the water of such bath with the aid of heat.

6. The method of treating a raw gum of the prepared class which consists in forming a bath including water and a metal compound active and in such quantity as to form with substantially all of either tannin or dyewood coloring matter present in or associated with such gum an insoluble compound, and later forming a solution of the gum in the water of such bath with the aid of heat.

7. The method of treating a raw gum of the prepared class which consists in forming a bath including water and a substance active and in such quantity as to form with substantially all of either tannin or dyewood coloring matter present in or associated with such gum an insoluble compound, and later forming a solution of the gum in the water of such bath.

GEORGE W. APSEY, Jr.